United States Patent [19]

Yabuta et al.

[11] Patent Number: 4,616,058

[45] Date of Patent: Oct. 7, 1986

[54] PROCESS FOR PREPARING A STABLE DISPERSION IN AN AQUEOUS MEDIUM OF PARTICLES OF POLYMER

[75] Inventors: Motoshi Yabuta; Yoshio Sasaki; Mototaka Iihashi, all of Hiratsuka, Japan

[73] Assignee: Kansai Paint Co., Ltd., Hyogo, Japan

[21] Appl. No.: 789,274

[22] Filed: Oct. 18, 1985

[51] Int. Cl.$^4$ .............................................. C08L 33/02
[52] U.S. Cl. .................................... 524/461; 524/457
[58] Field of Search ................................ 524/457, 461

[56] References Cited

U.S. PATENT DOCUMENTS

| | | | |
|---|---|---|---|
| 3,686,114 | 8/1972 | Thompson | 524/461 |
| 3,793,245 | 2/1974 | Clarke | 524/457 |
| 4,518,724 | 5/1985 | Kuwajima | 524/457 |
| 4,525,499 | 6/1985 | Hayashi | 524/457 |
| 4,539,362 | 9/1985 | Davies | 524/457 |

*Primary Examiner*—Paul R. Michl
*Attorney, Agent, or Firm*—Wenderoth, Lind & Ponack

[57] ABSTRACT

A process for preparing a stable dispersion in an aqueous medium of particles of polymer, said process comprising the steps of:

(a) reacting at least one radically polymerizable monomer in an organic liquid in the presence of a dispersion stabilizer for the particles to form particles of polymer insoluble in said organic liquid and water, said stabilizer being a resin having in each of its molecules on the average at least 0.3 unit of a polymerizable double bond and a functional group that can be neutralized with an acid or a base, said resin being capable of being emulsifiably dispersed or dissolved in an aqueous medium by neutralization;

(b) neutralizing with acids or bases the functional group of the resin as a dispersion stabilizer; and (c) replacing the organic liquid of the resulting dispersion of polymer particles with an aqueous medium.

14 Claims, No Drawings

PROCESS FOR PREPARING A STABLE DISPERSION IN AN AQUEOUS MEDIUM OF PARTICLES OF POLYMER

This invention relates to a process for preparing a stable dispersion in an aqueous medium of particles of polymer.

The aqueous dispersion of particles of polymer is usually prepared by such methods as the emulsion polymerization method in which an ionic or non-ionic surfactant is used or the self-emulsifying dispersion method which involves neutralizing with a low molecular weight acid or base a carboxyl or basic group-containing polymer that is formed in a liquid medium consisting predominantly of a water-miscible organic solvent and thereafter dispersing the neutralized product in an aqueous medium.

The emulsion polymerization method does suffer from certain limitations. One of these is the difficulty of choosing and using water-soluble monomers. Another drawbacks associated with aqueous emulsion polymerization is the fact that the presence of the surfactant and decomposed slices of an ionic polymerization initiator may deteriorate the film performance which can be attained in coating compositions based upon the resulting dispersion; for example, it is often difficult to obtain thermosetting films of high water resistance and weather-ability from such compositions.

On the other hand, the self-emulsifying dispersion method has the defect that the stability of the aqueous dispersion obtained is greatly influenced by the class and amount of the water-miscible solvent used and the polarity (degree of hydrophilicity) of polymer dispersed.

As a method of improving on these defects, there is disclosed in U.S. Pat. No. 4,209,435 (Japanese Laid-Open Patent Publication No. 66,949/1979) a method which comprises preparing in a nonaqueous liquid predominantly of an aliphatic hydrocarbon and in the presence of a steric stabilizer, a dispersion of polymer particles insoluble in said nonaqueous liquid (so-called nonaqueous polymer dispersion), and thereafter causing the migration of the polymer particles from the nonaqueous liquid to an aqueous medium by the use of a high molecular protective colloid comprised of a neutralized water-soluble polymer.

The stabilization of the polymer particles by this method are achieved by the formation of a steric barrier (steric repelling layer) of the high molecular protective colloid around the polymer particles. In addition, since the high molecular protective colloid is electrically charged to a certain degree, the stability of the polymer particles is further enhanced by its electrical repulsive force.

The degree to which the water-soluble polymer used as the high molecular protective colloid can adhere to the steric stabilizer that is bound to the surface of the polymer particles is however greatly influenced by the solubility of said water-soluble polymer in the aqueous medium or its affinity for the polymer particles and steric stabilizer. Hence, for obtaining a dispersion that is stable in practical applications, there are imposed restrictions as to how the steric stabilizer, high molecular protective colloid and polymer particles are combined. Difficulty is thus experienced in planning and preparing the dispersion. There is a further defect in that in the case where the dispersed particles in the nonaqueous liquid are not crosslinked to a high degree the dispersed particles are swelled or partially dissolved by the polar monomer that is used when the polymer to be used as the high molecular protective colloid is being synthesized in the presence of the dispersed particles, with the consequence that the viscosity of the whole dispersion system is increased. There is thus imposed a restriction on the use of the polar monomer. Further, the rate of feed of the monomers is also responsible for increasing the viscosity. This also makes it difficult to control the reaction system.

Such being the case, extensive researches were carried out by the present inventors with the view of developing a process for preparing a stable dispersion in an aqueous medium of particles of polymer free of the aforementioned defects, and the present inventors finally succeeded in perfecting the present invention.

There is thus provided in accordance with the present invention a process for preparing a stable dispersion in an aqueous medium of particles of polymer, which comprises the steps of:

(a) reacting at least one radically polymerizable monomer in an organic liquid in the presence of a dispersion stabilizer for the particles to form particles of polymer insoluble in said organic liquid and water, said stabilizer being a resin having in each of its molecules on the average at least 0.3 unit of a polymerizable double bond and a functional group that can be neutralized with an acid or a base (hereinafter referred to as neutralizable group), said resin being capable of being emulsifiably dispersed or dissolved in an aqueous medium by neutralization;

(b) neutralizing with an acid or a base the functional group of the resin has as a dispersion stabilizer; and (c) replacing the organic liquid of the resulting dispersion of polymer particles with an aqueous medium.

The resin used as dispersion stabilizer in step (a) of this invention (hereinafter referred to as dispersion stabilizer resin) is a resin having in its molecular chain on the average per molecule at least 0.3, preferably 0.3 to 3, and more preferably 0.7 to 1 polymerizable double bond, as well as a neutralizable group. Examples include those based on the acrylic resins, polyester resins and alkyd resins.

As neutralizable groups in the aforesaid resins, those that can be neutralized with bases include, for example the carboxyl, phosphoric acid and sulfonic acid groups. On the other hand, an example of the group that can be neutralized with an acid is the amino group. These neutralizable groups can be present in the molecular chain in an amount that is sufficient for emulsifiably dispersing or dissolving the dispersion stabilizer resin in an aqueous medium by its neutralization with the hereinafter mentioned acids or bases. More specifically, while the amount that can be present will depend upon the resin that is used as the base, usually the amount ranges from 20 to 200, and preferably from 35 to 100, in terms of the acid or amine value.

Further, in view of the fact that the dispersion stabilizer resin must be dissolved in an organic liquid of low polarity, it preferably is of low polarity.

Typical examples of the dispersion stabilizer resin that can be advantageously used in step (a) in accordance with this invention will now be more specifically described.

(A) Acrylic Resins

The acrylic resins can be synthesized in the following manner. For example, 2 to 30% by weight of an unsaturated monomer containing at least one carboxyl group is used as the requisite polymerization component, and this is copolymerized with at least one other radically polymerizable monomer to give an acrylic copolymer (base resin). A part of the carboxyl groups of the thus obtained resin is then reacted with the glycidyl groups of a glycidyl group-containing unsaturated monomer to synthesize the intended acrylic resin. There is thus obtained an acrylic resin having a carboxyl group that can be neutralized. This resin is effectively used as an anionic dispersion stabilizer.

Again, an acrylic resin can be obtained by using as the requisite polymerization components 2 to 30% by weight of an unsaturated monomer containing at least one tertiary amino group and 2 to 10% by weight of an unsaturated monomer containing at least one carboxyl group, and copolymerizing these with at least one radically polymerizable monomer to give an acrylic copolymer (base resin). At least a part of the carboxyl groups of the so obtained resin is then reacted with the glycidyl groups of a glycidyl group-containing unsaturated monomer to give an acrylic resin having a neutralizable tertiary amino group or both the tertiary amino group and a carboxyl group. This resin can be used as a cationic or amphoteric dispersion stabilizer.

The carboxyl group-containing monomers used in the synthesis of the aforesaid acrylic resin include, for example acrylic acid, methacrylic acid and crotonic acid. On the other hand, as the unsaturated monomer containing the tertiary amino group, included are the N,N-disubstituted aminoalkyl(meth)acrylates such as N,N-dimethylaminoethyl(meth)acrylate and N,N-diethylaminoethyl(meth)acrylate.

As the radically polymerizable acrylic monomers that can be copolymerized with these neutralizable group-containing monomers, usable are those that have been used heretofore in preparing the acrylic polymers by the radical polymerization method. Examples of these monomers are the $C_{1-18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl acrylate, hexyl methacrylate, octyl methacrylate and lauryl methacrylate; $C_{2-8}$ hydroxyalkyl esters of acrylic acid or methacrylic acid such as hydroxyethyl acrylate, hydroxyethyl methacrylate, hydroxypropyl acrylate and hydroxypropyl methacrylate; acrylonitrile and methacrylonitrile.

These radically polymerizable acrylic monomers can be used either singly or in combinations of two or more. As required, a part of the acrylic monomer may be substituted by other radically polymerizable monomers, for example an aromatic vinyl compound such as styrene, alpha-methylstyrene, or vinyltoluene.

The aforementioned carboxyl-containing unsaturated monomer, tertiary amino group-containing unsaturated monomer and radically polymerizable acrylic monomer can be copolymerized by a method known per se such as the solution or emulsion polymerization technique.

The introduction of a polymerizable double bond to the aforesaid acrylic copolymer that is used as the base of the dispersion stabilizer resin can usually be accomplished as described hereinbefore by reacting a glycidyl group-containing unsaturated monomer (e.g. glycidyl acrylate, glycidyl methacrylate or allylglycidyl ether) with the carboxyl group which is the neutralizable group. In addition to this method, in such a case where the acrylic copolymer has a hydroxyl group besides the carboxyl group and/or tertiary amino group, the introduction of the polymerizable double bond can also be performed by reacting hydroxyl group of said copolymer with an isocyanate group of an equimolar adduct of a diisocyanate compound (e.g. tolylene diisocyanate, 4,4'-diphenylmethane diisocyanate of isophorone diisocyanate) with a hydroxyl group-containing unsaturated monomer (e.g. hydroxyethyl acrylate or hydroxyethyl methacrylate). In the latter case, the acrylic copolymer should desirably contain as its constituent component at least 1% by weight, preferably 2 to 40% by weight, of the hydroxyl group-containing acrylic monomer unit.

Alternatively, the polymerizable double bond can also be introduced to the base resin by a procedure comprising introducing in advance an epoxy group to the carboxyl group and/or tertiary amino group-containing acrylic copolymer which is the base resin (for example, by using a glycidyl group-containing unsaturated monomer as one of the monomers in preparing the acrylic copolymer), and thereafter reacting an unsaturated acid such as acrylic acid or methacrylic acid with the epoxy group. In this case, the acrylic copolymer should desirably contain at least 1% by weight, preferably 2 to 40% by weight, of such a glycidyl group-containing unsaturated monomer unit as its constituent component.

Conveniently usable as the acrylic resin in step (a) of this invention is one having in general a weight average molecular weight of about 5000 to about 50,000 (number average molecular weight of about 1000 to about 30,000), preferably about 5000 to about 20,000. When the molecular weight is less than about 5000, the stability of the dispersed particles in the solvent is poor, and there is a tendency to flocculation or sedimentation of the particles. On the other hand, when the molecular weight exceeds about 50,000, a marked increase in viscosity takes place, with the consequence that there is the possibility that difficulty is experienced in the handling of the resin.

(B) Polyester Resins and Alkyd Resins

The polyester resins and alkyd resins usable in step (a) of this invention can be prepared, for example by directly reacting a glycidyl group-containing unsaturated monomer, such as hereinbefore described, with a part of the carboxyl groups of polyester or alkyd resins having carboxyl groups in their terminal or side chain. On the other hand, the introduction of the polymerizable double bond can also be performed by reacting the hydroxyl groups possibly present in the polyester or alkyd resins with either an equimolar adduct of a diisocyanate and a hydroxyl group-containing unsaturated monomer, such as described in (A), above, or isocyanate ethyl(meth)acrylate.

The polyester of alkyd resins having carboxyl groups in their terminal or side chain should desirably have a resin acid value of usually at least 20, preferably 40 to 70. Even in the case of the polyester or alkyd resins having a low resin acid value of less than 20, they can be used as the above-described starting material by increasing the resin acid value by the introduction of the carboxyl groups by reacting an acid anhydride such as phthalic anhydride or trimellitic anhydride with the hydroxyl groups present in the resins.

The term "resin acid value", as used herein, denotes the number of milligrams of KOH required for neutralizing 1 gram of resin.

The above-mentioned base the polyester or alkyd resins functions as a dispersion stabilizer for an anionic aqueous dispersion on being neutralized in the hereinbelow-described step (b). (C) Other resins.

As other dispersion stabilizer resins that can be used in step (a) of this invention, there can be mentioned, for example the block or graft copolymers having a polymerizable double bond, which copolymers are comprised, for example of a first segment having a sufficient amount of neutralizable groups to render the polymer into an emusifiably dispersed or dissolved state when neutralized and a second segment substantially free of neutralizable groups; an example being the grafted product of a carboxyl group-containing acrylic polymer and a cellulose derivative, to which has been introduced a polymerizable double bond. These are resins that can also be suitably used in this invention.

The graft copolymer can be obtained in the following manner. A vinyl monomer mixture containing acrylic acid or methacrylic acid as its indispensable components is polymerized in the presence of a cellulose derivative such as cellulose acetate butyrate using a polymerization initiator such as benzoyl peroxide or tert-butylhydroperoxide to give a carboxyl group-containing grafted product, after which a glycidyl group-containing unsaturated monomer such as mentioned hereinbefore is caused to react with a part of the carboxyl groups of the grafted product.

When polymer particles are formed in a water-insoluble medium using this dispersion stabilizer and then the particles are caused to migrate to an aqueous medium, the water-insoluble cellulose portion becomes deposited on the surface of the polymer particles, and there thus can be formed a dispersion of greater stability.

As indicated hereinbefore, the dispersion stabilizer resin such as described above has at least 0.3 unit of a polymerizable double bond in each of its molecules. Hence, when a radically polymerizable monomer is polymerized in the presence of this dispersion stabilizer resin, the double bond becomes a linkage site of a graft or block to the dispersed particles, and it is presumed that at least 30% by weight of the dispersion stabilizer resin becomes linked as a graft or block to the surface of the dispersed polymer particles.

The dispersion stabilizer resins used in this invention can be used either singly or in combination of two or more classes. Further, they may also be used conjointly with a small amount of other dispersion stabilizers, for example the butyl etherized melamine-formaldehyde resin, air-dryable alkyd resin, or a graft resin obtained by polymerizing methyl methacrylate to an adduct of a self-condensed product of 12-hydroxystearic acid and glycidyl (meth)acrylate.

In accordance with step (a) of this invention, at least one radically polymerizable monomer is polymerized in an organic liquid in the presence of a dispersion stabilizer resin such as described above.

As the organic liquid to be used in the aforesaid polymerization reaction, included are those organic liquids that are substantially immiscible with water and do not substantially dissolve the dispersed polymer particles formed by the polymerization reaction but are good solvents for the dispersion stabilizer resin and the radically polymerizable monomer. Specific examples of such organic liquids are the aliphatic hydrocarbons such as hexane, heptane and octane; aromatic hydrocarbons such as benzene, toluene and xylene; or solvents of the alcohol, ether, ester and ketone types, in which the solubility in water at 20° C. is not more than 5 g, preferably not more than 2 g, per 100 g or the solubility of water in the organic liquid at 20° C. is not more than 10 g, preferably not more than 5 g per 100 g, examples being octyl alcohol, methyl isobutyl ketone, diisobutyl ketone, ethyl acyl ketone, methyl hexyl ketone, ethyl butyl ketone, ethyl acetate, isobutyl acetate, acyl acetate and 2-ethylhexylacetate. These organic liquids may be used either singly or as a mixture of two or more but, in general, conveniently used is a combination consisting predominantly of an aliphatic hydrocarbon suitably combined with an aromatic hydrocarbon or a solvent of the alcohol, ether, ester or ketone type such as indicated above.

If a medium consisting of only an organic liquid having a lower boiling point than water (e.g. hexane, heptane, toluene, etc.) is used as the organic liquid, the replacement with an aqueous medium is not only facilitated but can be carried out substantially completely in the subsequent step (c). It thus becomes possible to prepare an aqueous dispersion substantially free of an organic liquid.

On the other hand, when there is used as the organic liquid a mixture of a water-immiscible organic liquid having a boiling point lower than water and not more than about 30% by weight of a water-immiscible organic liquid having a boiling point higher than water (e.g. 2-ethylhexyl alcohol, n-octyl alcohol, benzyl alcohol, methyl isobutyl ketone, cyclohexanone, isophorone, terpentine oil, mineral spirit, etc.), the latter organic liquids can be made to remain on the surface or inside of the polymer particles even after the subsequent step in which they have been replaced with water, and consequently the access or permeation of water to the surface or interior of the polymer particles is hampered. Hence, the hydrolysis of the dispersed polymer can be prevented. A further feature is that when this aqueous dispersion is used in a coating material the evaporation of water is fast, and hence the coating material possesses superior drying property.

In a similar manner as with the foregoing water-immiscible organic liquids having a boiling point higher than water, the addition in small amounts of a plasticizer, degradation preventive agent (antioxidant, ultraviolet absorber, etc.) and curing catalyst makes it possible to deposit these additives on the surface or inside the resulting dispersed polymer particles.

Further, it is also possible to make conjoint use as the organic liquid in an amount not exceeding 50% by weight of a so-called water-soluble or hydrophilic organic liquid that is completely soluble in water or can be dissolved to a considerable degree. As this kind of organic liquid, included are those whose solubility in water at 20° C. is at least 5 g/100 g, examples of which are alcohols such as methanol, ethanol, isopropanol, n-butyl alcohol, isobutyl alcohol, tert-butyl alcohol and sec-butyl alcohol; and ethereal alcohol such as methyl cellosolve, cellosolve, isopropyl cellosolve, butyl cellosolve and diethylene glycol monobutyl ether.

The use of such water-soluble or hydrophilic organic liquids makes it possible to add the organic liquid dispersion to the aqueous medium in an optional proportion. Hence, the preparation of the aqueous dispersion is facilitated. Further, when an aqueous dispersion obtained by the use of a mixture of a low-boiling hydrophilic organic liquid and water is used as a coating material, there is obtained the effect that the evaporation of water at the time of application can be accelerated. There is also the advantage that since the solubility of the dispersion stabilizer resin is increased the choice of the dispersion stabilizer resin can be made from a wider range of resins.

There is imposed no particular restriction as to the monomers that are polymerized in the presence of the dispersion stabilizers and organic liquids described hereinbefore so long as they are radically polymerizable monomers. Various kinds can be used, typical examples of which are as follows:

(a) Esters of acrylic acid and methacrylic acid: for example the $C_{1-18}$ alkyl esters of acrylic acid and methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; glycidyl acrylate and glycidyl methacrylate; $C_{2-8}$ alkenyl esters of acrylic acid or methacrylic acid such as allyl acrylate and allyl methacrylate; $C_{2-8}$ hydroxyalkyl esters of acrylic acid or methacrylic acid such as hydroxyethyl acrylate, hydroxyethyl methacrylate, hydroxypropyl acrylate and hydroxypropyl methacrylate; and $C_{3-18}$ alkenyloxyalkyl esters of acrylic acid or methacrylic acid such as allyloxyethyl acrylate and allyloxyethyl methacrylate.

(b) Aromatic vinyl compounds: for example styrene, alpha-methylstyrene, vinyltoluene, p-chlorostyrene and vinylpyridine.

(c) Alpha,beta-ethylenically unsaturated acids: for example acrylic acid, methacrylic acid and itaconic acid.

(d) Others: acrylonitrile, methacrylonitrile, methyl isopropenyl ketone; vinyl acetate, Veoba monomer (a product of Shell Chemical Company), vinyl propionate, vinyl pivalate, etc.

Monomers and monomeric mixtures containing at least 40% by weight of an ester of acrylic acid or methacrylic acid are especially suitable of these monomers.

The polymerization of the foregoing monomers is carried out using a radical polymerization initiator. Usable radical polymerization initiators include, for example the azo-type initiators such as 2,2'-azoisobutyronitrile and 2,2'-azobis(2,4-dimethylvaleronitrile); and the peroxide-type initiators such as benzoyl peroxide, lauryl peroxide and tert-butyl peroctoate. These polymerization initiators can be used in an amount ranging from 0.5 to 10 parts by weight, preferably 0.5 to 5 parts by weight, per 100 parts by weight of the monomer used in the polymerization reaction.

While the amount used of the dispersion stabilizer resin varies widely depending upon the class of the resin, usually an amount ranging from 3 to 70% by weight, preferably 5 to 45% by weight, based on the total amount of the monomer to be polymerized and the dispersion stabilizer resin is conveniently used.

Further, it is desired that the total concentration of the monomer and the dispersion stabilizer in the organic liquid be usually from 30 to 70% by weight, and preferably from 30 to 60% by weight.

The polymerization reaction can be carried out by methods known per se. The reaction temperature at the time of the polymerization reaction generally ranges from 60° to 160° C., and the reaction can be usually completed in 1 to 15 hours.

There is thus obtained an organic liquid dispersion of polymer particles which consists of a dispersion in an organic liquid of polymer particles to whose surface has been grafted or linked as blocks a dispersion stabilizer resin.

In step (b) of this invention the neutralizable groups of the dispersion stabilizer resin are neutralized. When the neutralizable group is an acid group such as the carboxyl group, usable as the neutralizing agent are ammonia and the bases such as dimethylaminoethanol, methylamine, dimethylamine, ethylamine, diethylamine, triethylamine, diethylaminoethanol, diethanolamine and triethanolamine. When the neutralizable group is a basic group such as the tertiary amine group, the acids such as lactic acid, acetic acid, formic acid, propionic acid, hydroxyacetic acid, phosphoric acid and hydrochloric acid are used.

The neutralization is usually carried out on the dispersion stabilizer resin present at the surface of the dispersed particles of polymer prepared in step (a). The neutralization is performed to such a degree that the dispersion stabilizer resin used in step (a) emulsifiably disperses or dissolves in an aqueous medium. Specifically, the neutralization treatment is suitably carried out by adding the aforesaid neutralizing agents in an amount of about 0.5 to about 1.2 equivalents per equivalent of the neutralizable groups present in the resin.

The neutralizing step can be carried out by adding the neutralizing agent to the organic liquid dispersion of polymer particles obtained in step (a). At times, it may also be carried out after having replaced at least a part of the organic liquid of the dispersion with an aqueous medium.

While it is preferred in this invention that the neutralization of the neutralizable groups of the dispersion stabilizer resin be performed following step (a), it is also possible to use as the dispersion stabilizer resin in step (a) one whose neutralizable groups have already been neutralized with an acid or base prior to the polymerization reaction of step (a).

The replacement of the organic liquid with an aqueous medium (i.e. the conversion of the dispersion medium) in step (c) of this invention is usually carried out in the following manner. The organic liquid dispersion of polymer particles obtained from the steps described hereinbefore is subjected to reduced pressure to remove at least a part of the organic liquid from the dispersion. This is followed by the addition of water and thorough stirring and, as required, further removal of at least a part of the remaining organic liquid under reduced pressure.

On the other hand, when it is desired to remove the organic liquid virtually completely from the aqueous medium, the conversion of the dispersion medium can be carried out by suitably choosing the organic liquid and performing the azeotropic distillation of water and the organic liquid.

Further, the conversion of the dispersion medium can also be performed in the following manner. After having performed the neutralization in accordance with step (b) of this invention, the organic liquid is completely removed under reduced pressure or by heating to yield a product as a dry powder, following which this powder is redispersed in an aqueous medium.

The aqueous dispersion of polymer particles prepared by the process of this invention described hereinbefore has an extremely superior dispersion stability and can be used in such applications as coating materials, molded articles, adhesives, fillers, etc.

While the aqueous dispersion provided by this invention can be used as such, it can also be incorporated with colorants, plasticizers, curing agents, etc., as required. The colorants include dyestuffs and organic and inorganic pigments. As plasticizers, those known, for example the low-molecular-weight plasticizers such as dimethyl phthalate and dioctyl phthalate, and the high-molecular-weight plasticizers such as the vinyl polymer-type plasticizers and the polyester-type plasticizers can be used. These plasticizers can be used by mixing them in advance in the dispersion liquid, or they can be incorporated in the dispersed polymer particles by dissolving them in the radically polymerizable monomer at the time of preparing the dispersion. On the other hand, usable as the curing agents are such crosslinking agents as the amino resins and epoxy resins.

The following examples and comparative examples will serve to illustrate the present invention more specifically. In the examples and comparative examples the parts and percentages are all on a weight basis.

EXAMPLE 1

Synthesis of Dispersion Stabilizer (A)

Seventy parts of isopropyl alcohol and 30 parts of butyl cellosolve were heated under reflux, after which the following monomers and polymerization initiator were added dropwise over the course of 3 hours.

|  | Parts |
| --- | --- |
| Styrene | 15 |
| n-Butyl methacrylate | 20 |
| Lauryl methacrylate | 43 |
| 2-Hydroxyethyl methacrylate | 15 |
| Methacrylic acid | 7 |
| 2,2'-Azobisisobutyronitrile | 2 |

After completion of the addition, the reaction mixture was aged for 2 hours. The resulting acrylic resin varnish had a nonvolatile matter content of 50%, a viscosity (Gardener, 25° C.; applies equally hereinafter) of N, and a weight average molecular weight of about 15,000. This was followed by the addition of 1 part of glycidyl methacrylate, 0.02 part of 4-tert-butyl pyrocatechol and 0.1 part of dimethylaminoethanol to the total amount of the foregoing varnish, after which the mixture was reacted under reflux for 5 hours to introduce a copolymerizable double bond into the molecular chain of the dispersion stabilizer. On measurement of the resin acid value, the number of double bond introduced was found to be about 0.7 unit per molecular chain.

Synthesis of Dispersed Polymer

One hundred parts of heptane and 50 parts of the dispersion stabilizer (A) were charged to a flask and refluxed at about 98° C., after which the following monomers and polymerization initiator were added dropwise over the course of 4 hours.

|  | Parts |
| --- | --- |
| Styrene | 15 |
| Methyl methacrylate | 45 |

|  | Parts |
| --- | --- |
| Acrylonitrile | 25 |
| 2-Hydroxyethyl methacrylate | 15 |
| 2,2'-Azoisobutyronitrile | 1 |

After completion of the addition, the reaction mixture was aged for 2 hours. There was thus obtained a milky white stable dispersion of polymer particles of low viscosity having a nonvolatile matter content of 50%, a viscosity of B and particle diameter of 0.2 to 0.4 micron (as determined by an electron microscope; applies equally hereinafter).

Conversion to an Aqueous Medium

One hundred parts of the polymer dispersion and 0.7 part of dimethylaminoethanol were charged to a flask and thoroughly stirred. The mixture was then heated at about 80° C., and the solvent was recovered under reduced pressure. After concentrating the polymer dispersion until its solids content reached 70%, 50 parts of distilled water was added, and while the mixture was being thoroughly stirred, it was heated up to 90° C., and further recovery of the solvent was carried out under reduced pressure. The thus obtained aqueous dispersion had a solids content of 45%, and the composition of the aqueous medium at this time was as follows:

The resulting aqueous dispersion had a viscosity of H and a particle diameter of 0.2 to 0.4 micron. There was no difference in the particle diameter between this aqueous dispersion and the dispersion in the organic medium. The resulting dispersion was left standing for one month at room temperature, but there was seen no formation of any sediment and no occurrance of coarse particles.

|  | Parts |
| --- | --- |
| Water | 82 |
| Isopropyl alcohol | 8 |
| Butyl cellosolve | 10 |
| Heptane | trace |

EXAMPLE 2

One hundred parts of isopropyl alcohol and 50 parts of dispersion stabilizer (A) were charged to a flask, and while maintaining a reflux temperature of 83° C., the following monomers and polymerization initiator were added dropwise over the course of 4 hours.

|  | Parts |
| --- | --- |
| Acrylonitrile | 50 |
| Methyl methacrylate | 25 |
| Styrene | 10 |
| 2-Hydroxyethyl methacrylate | 15 |
| 2,2'-Azoisobutyronitrile | 1.5 |

After completion of the addition, the reaction mixture was aged for 2 hours. Dimethylaminoethanol (2 parts) was then added, and the mixture was stirred. This was followed by the addition of 125 parts of distilled water, and while heating the mixture the organic solvent was recovered under reduced pressure at 80° to 90° C.

The thus obtained aqueous dispersion was of a somewhat yellowish creamy color and had a solids content of 45%, a viscosity of J and a particle diameter of 0.3 to 0.5 micron.

The composition of this aqueous medium was as follows:

|  | Parts |
| --- | --- |
| Water | 82 |
| Isopropyl alcohol | 8 |
| Butyl cellosolve | 10 |

EXAMPLE 3

Seventy parts of heptane, 30 parts of isopropyl alcohol, 50 parts of dispersion stabilizer (A), 1 part of dimethylaminoethanol and 15 parts of butylated melamine resin (Uban 20 SE, a product of Mitsui Toatsu Chemicals, Inc., 60% solution) were charged to a flask, and while maintaining a reflux temperature the following monomers and polymerization initiator were added dropwise over the course of 3.5 hours.

|  | Parts |
| --- | --- |
| Styrene | 15 |
| Methyl methacrylate | 45 |
| Acrylonitrile | 25 |
| 2-Hydroxypropyl methacrylate | 15 |
| 2,2'-Azoisobutyronitrile | 1.5 |

After completion of the addition, the reaction mixture was aged for 2 hours. 2-Dimethylaminoethanol (1 part) was further added followed by stirring the mixture. Water (135 parts) at about 65° C. was then added, and while slowly heating the mixture heptane and isopropyl alcohol were recovered under reduced pressure.

The resulting aqueous dispersion had a solids content of 42.5% and a viscosity of L. Even though this dispersion was let standing for one month at room temperature, it was stable, there being seen no formation of any sediment.

The composition of this aqueous medium was as follows:

|  | Parts |
| --- | --- |
| Water | 74.5 |
| Isopropyl alcohol | 13.8 |
| Butyl cellosolve | 8.3 |
| Butyl alcohol | 2.3 |
| Xylol | 0.1 |

When this aqueous dispersion was coated on a sheet glass and heated at 140° C. for 30 minutes, a transparent, highly glossy and hard crosslinked coated film having a gel fraction of 97% was obtained.

EXAMPLE 4

One hundred parts of heptane, 50 parts of dispersion stabilizer (A) and 1 part of 2-dimethylaminoethanol were charged to a flask, and while maintaining a reflux temperature of 980° C. the following monomers and polymerization initiator were added dropwise over the course of 4 hours.

|  | Parts |
| --- | --- |
| 2-Hydroxyethyl acrylate | 68 |
| Methyl acrylate | 25 |

| -continued | |
| --- | --- |
|  | Parts |
| 1,6-Hexanediol diacrylate | 5 |
| Methacrylic acid | 2 |
| 2,2'-Azoisobutyronitrile | 1 |

After completion of the addition, the reaction mixture was aged for 2 hours. After the addition further of 1 part of dimethylaminoethanol, 125 parts of distilled water was added, following which the reaction mixture was heated, and the organic solvent was recovered under reduced pressure. The resulting aqueous dispersion had a solids content of 45% and a viscosity of N. The particles were crosslinked, and even though a large amount of acetone was added, the particles were not dissolved.

EXAMPLE 5

Synthesis of Dispersion Stabilizer (B)

Seventy parts of toluene and 30 parts of octyl alcohol were refluxed, and then the following monomers and polymerization initiator were added dropwise over the course of 3 hours.

|  | Parts |
| --- | --- |
| Styrene | 15 |
| n-Butyl methacrylate | 40 |
| Lauryl methacrylate | 35 |
| Dimethylaminoethyl methacrylate | 9 |
| Acrylic acid | 1 |
| 2,2'-Azoisobutyronitrile | 2 |

After completion of the addition, the reaction mixture was aged for 2 hours. To the total amount of the resulting copolymer resin varnish were then added 1 part of glycidyl methacrylate and 0.02 part of 4-tert-butylpyrocatechol, after which a reflux reaction was continued for 5 hours. The polymerizable double bond introduced amounted to about 0.7 unit per molecular chain.

Synthesis of Dispersed Polymer

One hundred parts of heptane and 50 parts of dispersion stabilizer (B) were charged to a flask, and while maintaining a reflux temperature the following monomers and polymerization initiator were added dropwise over the course of 4 hours.

|  | Parts |
| --- | --- |
| Styrene | 15 |
| Methyl methacrylate | 45 |
| Acrylonitrile | 25 |
| 2-Hydroxyethyl methacrylate | 15 |
| Tert-butyl peroctoate | 1.5 |

After completion of the addition, the reaction mixture was aged for 2 hours. The resulting liquid was a yellowish dispersion. After adding 2.7 parts of acetic acid to this dispersion, the heptane and toluene were recovered at reduced pressure until the solids content became about 70%. This was followed by carrying out the further recovery of the solvents by adding 150 parts of hot water at about 80° C. Water recovered at the same time was returned to the system to adjust the solids content to 45%.

The composition of the aqueous medium of the aqueous dispersion was as follows:

|  | Parts |
|---|---|
| Water | 90 |
| Octyl alcohol | 10 |
| Heptane | trace |
| Toluene | trace |

This dispersion contained about 5.5% of octyl alcohol, but it was stable, there being no sedimentation of particles nor separation of the organic solvents even after it was left standing for one month.

EXAMPLE 6

Fifty parts of the dispersion stabilizer (A) obtained in Example 1, 1.7 parts of dimethylaminoethanol and 100 parts of heptane were charged to a flask, and the dispersion stabilizer (A) was neutralized with stirring. The contents were then refluxed at about 98° C., and the following monomers and polymerization initiator were added dropwise over the course of 4 hours.

|  | Parts |
|---|---|
| Styrene | 15 |
| Methyl methacrylate | 45 |
| Acrylonitrile | 25 |
| 2-Hydroxyethyl methacrylate | 15 |
| 2,2'-Azoisobutyronitrile | 1 |

After completion of the addition, the reaction mixture was aged for 2 hours. As in Example 1, the resulting liquid was a milky white, stable low viscosity polymer dispersion. This dispersion was then heated at about 80° C., and the solvents were recovered under reduced pressure followed by concentrating the dispersion until its solids content became 70%. This was followed by the addition further of 50 parts of distilled water, heating the dispersion up to 90° C. with thorough stirring, and recovering the solvents further under reduced pressure to give an aqueous dispersion having a solids content of 45%. The aqueous dispersion thus obtained was the same as that of Example 1.

COMPARATIVE EXAMPLE 1

An organic liquid dispersion of polymer particles was prepared in the same manner as in Example 1 but using as the dispersion stabilizer one that had been synthesized without introducing glycidyl methacrylate into the molecular chain during the step of synthesizing the dispersion stabilizer (A). The organic liquid dispersion thus obtained was relatively stable, and there was seen no sedimentation even after it was left standing for one month. However, when the organic liquid of this dispersion was replaced with an aqueous medium as in Example 1, the resulting aqueous dispersion, after standing for one week, separated into two layers, a transparent supernatant portion and a sedimental portion, and the lower layer became pasty like pudding.

COMPARATIVE EXAMPLE 2

An aqueous dispersion was prepared in the same manner as in Example 4 using the same monomeric composition but without using 1,6-hexanediol diacrylate. In this case the viscosity of the whole system increased to become a puddinglike semisolid product. These particles were completely soluble in acetone.

What is claimed is:

1. A process for preparing a stable dispersion in an aqueous medium of particles of polymer, said process comprising the steps of:
   (a) reacting at least one radically polymerizable monomer in an organic liquid in the presence of a dispersion stabilizer for the particles to form particles of polymer insoluble in said organic liquid and water, said stabilizer being a resin having in each of its molecules on the average at least 0.3 unit of a polymerizable double bond and a functional group that can be neutralized with an acid or a base, said resin being capable of being emulsifiably dispersed or dissolved in an aqueous medium by neutralization;
   (b) neutralizing with acids or bases the functional group of the resin as a dispersion stabilizer; and
   (c) replacing the organic liquid of the resulting dispersion of polymer particles with an aqueous medium.

2. The process of claim 1 wherein said dispersion stabilizer is a resin having in each of its molecules on the average 0.3 to 3 units of a polymerizable double bond and a functional group that can be neutralized with an acid or a base.

3. The process of claim 1 wherein said dispersion stabilizer is a resin having an acid or amine value of 20 to 200.

4. The process of claim 1 wherein said dispersion stabilizer is a member selected from the group consisting of the acrylic resins, polyester resins, alkyd resins, and grafted products of a carboxyl group-containing acrylic resin and a cellulose derivative.

5. The process of claim 4 wherein the acrylic resins are those having a weight average molecular weight ranging from 5000 to 50,000.

6. The process of claim 4 wherein said acrylic resin is obtained by using as the requisite polymerization component 2 to 30% by weight of a carboxyl group-containing unsaturated monomer, copolymerizing this monomer with another radically polymerizable acrylic monomer, and thereafter reacting a part of the carboxyl groups of the resulting copolymer with glycidyl groups of a glycidyl group-containing unsaturated monomer.

7. The process of claim 4 wherein the polyester and alkyd resins have an acid value of at least 20.

8. The process of claim 1 wherein the organic liquid does not dissolve the dispersed polymer particles and is substantially immiscible with water but is a good solvent for the stabilizer and the radically polymerizable monomers.

9. The process of claim 7 wherein the organic liquid is a solvent mixture predominantly of aliphatic hydrocarbons.

10. The process of claim 1 wherein the monomers polymerized in step (a) are monomers or monomeric mixtures containing at least 40% by weight of the esters of acrylic acid and methacrylic acid.

11. The process of claim 1 which comprises using the dispersion stabilizer in an amount of 3 to 70% by weight based on the total amount of the monomers to be polymerized and the dispersion stabilizer.

12. The process of claim 1 wherein the total concentration in the organic liquid of the monomers and the dispersion stabilizer is in the range of 30 to 70% by weight.

13. The process of claim 1 wherein the neutralization in step (b) is carried out by adding 0.5 to 1.2 equivalents of a neutralizing agent per equivalent of the neutralizable groups present in the dispersion stabilizer.

14. The process of claim 1 wherein the replacement of the organic liquid with an aqueous medium in accordance with step (c) is carried out by subjecting the organic liquid dispersion of polymer particles obtained in step (b) to reduced pressure to remove at least a part of the organic liquid and thereafter adding water to the dispersion.

* * * * *